(12) United States Patent
Pellenc (10) Patent No.: US 7,880,444 B2
(45) Date of Patent: *Feb. 1, 2011

(54) PROCESS FOR BALANCED CHARGING OF A LITHIUM ION OR LITHIUM POLYMER BATTERY

(75) Inventor: Roger Pellenc, Pertuis (FR)

(73) Assignee: Pellenc (SA), Pertuis (FR)

( * ) Notice: Subject to any disclaimer, the term of this patent is extended or adjusted under 35 U.S.C. 154(b) by 152 days.

This patent is subject to a terminal disclaimer.

(21) Appl. No.: 11/795,263

(22) PCT Filed: Jan. 10, 2006

(86) PCT No.: PCT/FR2006/050008

§ 371 (c)(1),
(2), (4) Date: Jul. 13, 2007

(87) PCT Pub. No.: WO2006/075112

PCT Pub. Date: Jul. 20, 2006

(65) Prior Publication Data

US 2008/0197805 A1    Aug. 21, 2008

(30) Foreign Application Priority Data

Jan. 14, 2005    (FR) .................................. 05 00423

(51) Int. Cl.
*H02J 7/04* (2006.01)
*H02J 7/16* (2006.01)
*H02J 7/00* (2006.01)

(52) U.S. Cl. ................ 320/162; 320/116; 320/118; 320/119; 320/122

(58) Field of Classification Search ........... 320/162
See application file for complete search history.

(56) References Cited

U.S. PATENT DOCUMENTS

| 5,773,159 | A | 6/1998 | Beard |
| 5,773,959 | A | 6/1998 | Merritt et al. |
| 7,081,737 | B2 * | 7/2006 | Liu et al. ............... 320/130 |
| 7,126,312 | B2 * | 10/2006 | Moore ................. 320/157 |
| 7,417,405 | B2 * | 8/2008 | Carrier et al. ........... 320/116 |
| 2003/0222619 | A1 * | 12/2003 | Formenti et al. ......... 320/119 |
| 2004/0021440 | A1 * | 2/2004 | Pannwitz ............... 320/100 |

FOREIGN PATENT DOCUMENTS

GB    2 372 645 A    8/2002

* cited by examiner

*Primary Examiner*—Edward Tso
*Assistant Examiner*—Ahmed Omar
(74) *Attorney, Agent, or Firm*—Young & Thompson (57) ABSTRACT

The invention relates to a method for the balanced charging of n cells which form a lithium-ion or lithium-polymer battery and which are connected in series. The invention is characterised in that the method consists in monitoring the charge levels of the different cells (1) from the moment ($t_1$) following the beginning of the battery (2) charging operation until said operation ends normally or is interrupted; and, as a function of the pre-evaluation of said charge levels, either powering of all the cells (1) uniformly or balancing the cell (1) charge levels by powering same in a differentiated manner as a function of the current charge levels thereof.

19 Claims, 5 Drawing Sheets

PROCESS FOR BALANCED CHARGING OF A LITHIUM ION OR LITHIUM POLYMER BATTERY

The present invention relates to the field of charging or the charge of rechargeable batteries, and has for its object a process for charging or of balanced charging, with time, of cells of a lithium ion or lithium polymer battery.

Optimum electrical charging of batteries comprising several constituent cells, poses problems difficult to solve, particularly when the number of elements or cells in series is high.

In the case of a lithium ion or lithium polymer battery, there is added to these problems the optimization of the charge of the different elements or cells, risks of irremediable deterioration of said elements or said cells in the case of overcharging, particularly by overheating or over-voltage.

It is known on the one hand that in batteries which use lithium ion or lithium polymer elements in series, the performances of capacitance of each element or cell after charging are not identical and that these differences increase from cycle to cycle of charging and discharging until the end of the life of the battery in question.

It is known, on the other hand, that the lithium ion and lithium polymer batteries cannot be overcharged on the occasion of charging, nor undercharged on the occasion of use (discharge). The value of maximum retained voltage, by way of example and not in a limiting sense, for the overcharge for each of the elements of a lithium ion and lithium polymer battery in series, is 4.20 volts and the retained tension to stop discharge, and thereby avoid degradation of the battery, is 2.70 volts.

It is generally that, for each of the lithium ion or lithium polymer elements or cells, the voltage at the terminals of the element or of the cell is the image of the capacitance stored in the element or the cell in question. This indication of voltage does not give the precise value of capacitance in ampere/hours or in watt/hours, but gives a percentage of the capacitance of the element in question at the time of measuring this voltage.

Figure 1:
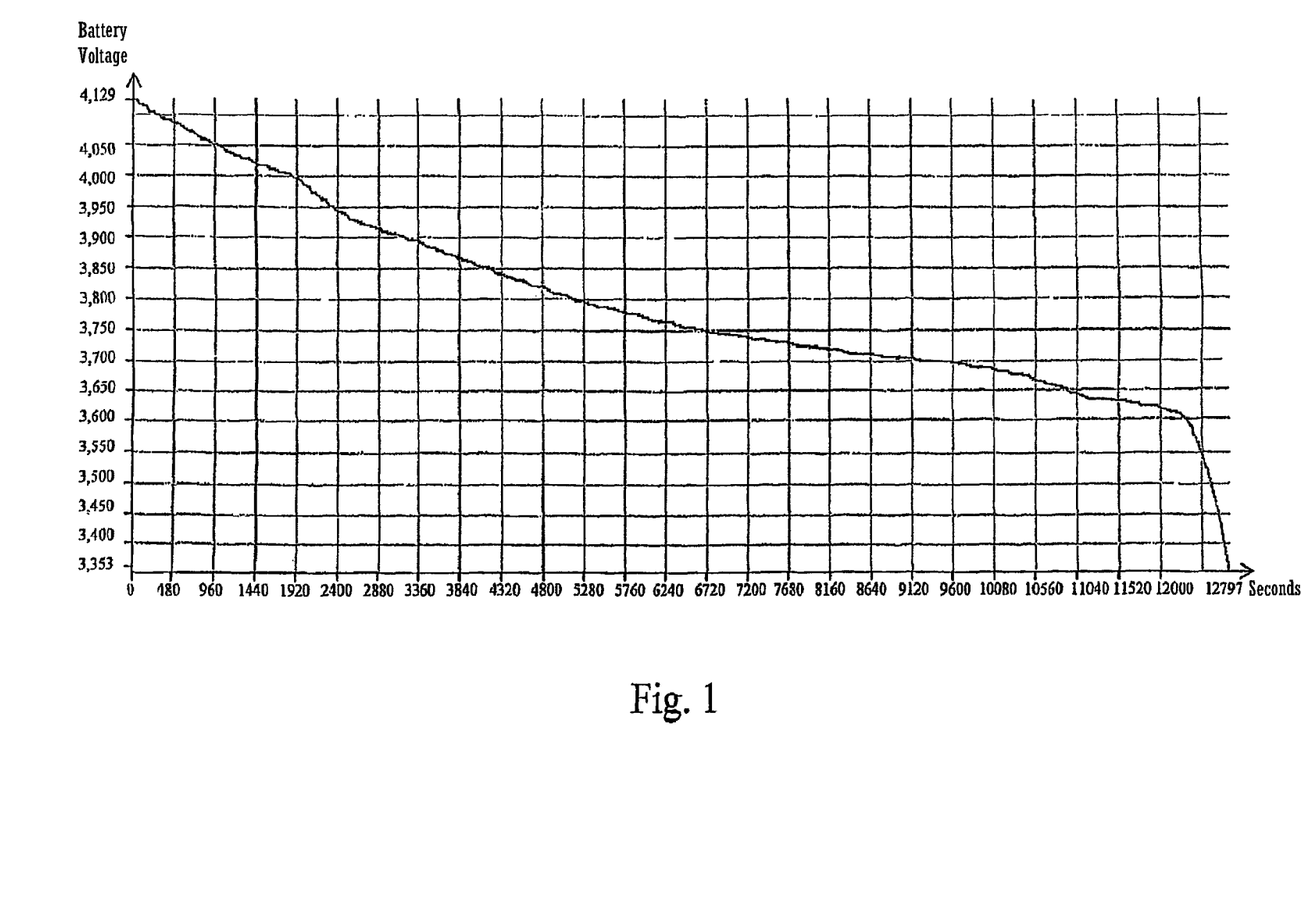
FIG. 1 of the accompanying drawings depicts a curve showing the development of the voltage at the terminals of a lithium ion element relative to its capacitance.

FIG. 1 of the accompanying drawings shows a curve showing the development of the voltage at the terminals of a lithium ion element relative to its capacitance (in the case of the discharge curve with constant current, the time is proportional to the percentage of the capacitance stored in the lithium ion element in question, wherein: 0 sec=>95% (4.129 volts), 6.150 seconds=>50% (3.760 volts) and 12.300 seconds=>0% (3.600 volts). It should be noted that over an important portion of this curve, the capacitance is substantially linear before rapidly degrading. To control the operations of charge and discharge of a lithium ion element or cell, operation is conducted in the substantially linear portion, which permits affirming that the voltage is the image of the capacitance.

Given the indications developed in the three preceding points, it can be verified that, in a battery constituted by more than three to four lithium ion or lithium polymer elements in series, the charging of the battery will be stopped when the most highly charged element will have reached 4.20 volts and, conversely, during discharge, the latter will be stopped when the element of least capacitance will have reached the voltage of 2.70 volts: it is hence the element which has the lowest capacitance which determines the overall capacitance of the battery. This permits understanding that, when the battery has a large number of elements in series, the risk of not using all of the capacitance of the battery is real, because it is the least capacitative element which determines in a limiting manner the total capacitance of the battery. Moreover, this phenomenon worsens as the charging/discharging cycles accumulate.

This phenomenon of unbalanced charging is essentially caused by the differences of capacitance and of internal resistance between the constituent elements of the battery, these differences resulting from the variation of the quality of production of the lithium ion or lithium polymer elements.

So as to optimize the capacitance of the battery over time, which is very important for the cost of use, it is necessary to overcome the problem stated above by providing, before stopping the charge, a rebalancing of all the elements or all the cells of the battery. This balancing will permit charging 100% of all the elements no matter what their capacitance.

In the present state of the art, this balancing takes place at the end of charging, by deriving the charge current of the element charged to 100%, which is to say when this latter has reached a voltage of 4.20 volts. Thus, the elements are thus stopped when they reach 4.20 volts and there is thus obtained a charge of 100% of all the elements at the end of the charging operation.

But this known balancing technique at the end of charging has notable drawbacks.

Thus, these balancing systems require resistances of important magnitude to be able to dissipate the consequent currents, and this the more so as the balancing system enters into action when the charge currents are greater still, which takes place when the elements of the battery are very unbalanced.

Moreover, this great dissipation of power gives rise to a consequent increase of temperature, which can be troublesome in the case of compact batteries integrating derivative resistances.

Moreover, it could happen that, despite the injection of large charging currents toward the end of the charging operation, the battery will not be balanced when the end of charging condition is fulfilled.

Still further, it should also be noted that the lithium ion batteries are lithium polymer batteries can potentially be dangerous at the end of charging, given their nature and their quantity of stored energy, the cells being practically charged to their maximum level.

Thus, the application of high charging currents in this condition and in this situation, to balance the cells that are lacking charge, gives rise to overheating of the elements in question, which can lead to explosion of these latter in extreme cases.

Finally, the application of high intensity charging currents accelerates the aging of the cells of the battery and hence decreases their performance.

Furthermore, in high power applications, the recharging time of the battery, particularly for complete recharging, is long, even very long. It thus frequently happens that the effective charging time between two phases of discharge will be too short to terminate the charging operation, and the charge is thus interrupted whilst the unbalances between the elements or cells are still not compensated (in the case of the presence of a balancing system at the end of charge according to the prior art). The repetition of this phenomenon also gives rise to rapid degradation of the performance of the battery in question.

The present invention has for its object to propose an optimized charging solution, having the mentioned advantages and overcoming the previously mentioned drawbacks with respect to the state of the art.

To this end, the invention has for its object a process for balanced charging of n cells, with n≧2, constituting a lithium ion or lithium polymer battery and associating in series, each cell being comprised of one or several elements mounted in parallel, this processing being characterized in that, for each charging operation, it consists in carrying out, continuously or cyclically, from an instant $t_1$ following the beginning of the charging operation in question and until the normal end or anticipated interruption of this operation, a surveillance of the charge levels of the different cells, and in carrying out, as a function of said evaluation of said charge levels, either a uniform supply of all the cells, or a balancing of said levels of charge of said cells by supplying these latter in a differentiated manner as a function of their current charge levels.

The instant $t_1$ from which the central charging of the different cells of the battery takes place, could either be fixed by manufacture, or result from a single adjustment after production or if desired be adjustable by the user or by a trained person (specialized maintenance personnel).

It is quite evident that the nearer instant $t_1$ will be to the instant $t_0$ at the beginning of the charging operation, the quicker will the levels of charge of the different cells be balanced and equalized and hence important disequilibria avoided, particularly in the case of interrupting charging before its normal end (charging accident, malfunction, deliberate end of the charge by the user, . . . ).

Thus, given the various considerations, the instant $t_1$ could be fixed immediately after execution of a certain number of tests of the charging means and of the cells, consecutive to the beginning of the charging operation.

However, it can also be provided, when the different cells have very similar characteristics and/or when no time constraint for charging is needed, that the instant $t_1$ will be offset in time from the instant $t_0$ by fraction of the theoretical maximum charge time of the cells of the battery, thereby limiting the controlled supply phase with eventual balancing of the different cells, as well as the number of cycles of the different sequential measuring, evaluation and differentiated feed operations.

Finally, it can also be provided that the instant $t_1$ varies in the course of the lifetime of the battery, by being relatively distant from instant $t_0$ at the beginning of the charge or recharge, when the battery is new, and by being nearer this instant to at the end of the battery life (generally after several hundreds of charge/discharge cycles).

Thus, for a new battery, of high quality, the different cells comprising it are generally of substantially similar characteristics and properties.

As a result, their charging takes place in a semi-balanced manner and only a slight balancing by differentiated supply is necessary at the end of the charging.

However, as the batteries age, even those having substantially similar cells when new, become cells whose characteristics and properties are substantially different from each other and which leads, at the end of charging, to very variable charge levels in the absence of a compensation or balancing during the charge. In this case, the balanced charging according to the invention will begin at an early phase of charging, even practically immediately after the beginning of the charging or recharging operation.

Thus, there can be if desired be provided an automatic modification, for example by decreasing with each subsequent charging operation the time interval $t_1-t_0$, of the instant $t_1$ of balanced charging according to the invention, the charging between $t_0$ and $t_1$ being thus able to take place in a conventional manner, without control and possible adjustment of the supply of the different cells.

There could also be provided a test at the beginning of use of a new battery or before its shipping by the manufacturer, indicating or fixing an initial value $t_1$ or a parameter permitting determining this value.

Thus, the interval $t_1-t_0$ could vary for example from practically several seconds to several tenths of a percent of the total theoretical duration of the battery charge.

The steps of the process mentioned above can be carried out in two different manners, according to two technologically different implementations.

Thus, by using a solution based essentially on an analog technology, the surveillance of the charge levels is carried out in a continuous manner and the differentiated supply is carried out, after instant $t_1$, as soon as, and as long as, the differences of charge level, between the most and least charged cells, exceeds a predetermined threshold value.

As a modification, using a preferred solution which uses a digital processing of the signals and a management of the process by a digital processing unit, the surveillance of the charge levels is carried out by repeated measurements and the differentiated supply applied during a predefined time, in case of verification of the conditions of this equilibrium of the required charge levels.

This second solution permits simplifying both the material and the software implementations necessary for practicing the process.

As to this second solution, the process consists preferably in triggering for each cell of the battery, one after the other, in a sequential manner during fractional duration of the total charge time of the battery, sequences comprising a refreshed evaluation of the charge level of the cell in question, followed, as a function of its charge level and in relation to all the charge levels of the other cells of the battery, a uniform or differentiated supply, this according to a repetitive cycle, beginning at instant $t_1$, all during the charging operation.

According to an advantageous embodiment of the invention, said process comprises at least the execution of the following operations under the management of a digital processing unit, and this from the instant $t_1$:

evaluation, preferably at regular intervals, of the quantity of energy stored in each cell by measuring an indicative parameter of said quantity;

comparative analysis of the different quantities of energy evaluated or the different values of the measured parameter;

determination of the tardiest cell to charge, and, as the case may be, of the cell or cells most advanced in charging;

supplying the different cells mounted in series in a uniform manner or with limitation of the charge current for the cells other than the most retarded or most advanced, by derivation of all or a portion of said current at the level of this or these latter;

sequential repetition of the different said operations until there is obtained an end of charge condition of the battery or the detection of a default, of a dysfunction or of the exceeding of a permissible threshold value.

The experiments and work of the applicant have shown that this sequential balancing process permits having all the elements or cells constituting the battery charged at the same percentage at a given instant of charging, and thus to achieve 100% capacity for all the elements constituting the battery at the end of normal charging, and this independently of their own capacitance.

Similarly, in the case of interruption of the charging operation before its normal end, a charge level which is substantially identical for all the cells will be guaranteed.

BRIEF DESCRIPTION OF THE DRAWINGS

The invention will be better understood, from the following description, which relates to a preferred embodiment, given by way of non-limiting example, and explained with reference to the accompanying schematic drawings, in which.

This latter has for its object a process for charging or balanced charging of n cells 1, wherein n≧2, constituting a lithium ion or lithium polymer battery 2 and associated in series, each cell 1 being comprised by one or several elements mounted in parallel.

According to an advantageous embodiment of the invention, this process comprises, for each charging operation, at least the execution of the following operations under the management of a digital processing unit, and this from an instant $t_1$ subsequent to the beginning of the charge:

evaluation, preferably at regular intervals, of the quantity of energy stored in each cell 1 by measuring a parameter indicative of said quantity;

comparative analysis of the different quantities of energy evaluated or the different values of the measured parameter;

determination of the cell 1 most tardy in charging and, as the case may be, of the cell or cells 1 the most advanced in charging;

supplying the different cells 1 mounted in series in a uniform manner or with limitation of the charge current for the cells 1 other than the most retarded or the most advanced in charging, by derivation of all or a portion of said current in this or these latter;

sequential repetition of the different said operations until there is obtained an end of charging condition of the battery 2 or the detection of a fault, or a dysfunction or the exceeding of an admissible threshold value.

Preferably, the parameter measured in each cell 1 and used for the evaluation of the quantity of energy stored in this latter, is the voltage at the terminals of the cell 1 in question.

As indicated above, the limitations of the charging current can if desired affect all the cells in advance of charging relative to the least charged cell, as the case may be with different degrees of supply limitation.

However, so as further to spread out the active balancing phases, the invention preferably provides that only the cell or cells of the most advanced charging condition (during a given fractional duration n), will be subjected to limitation of charge (during the following fractional duration n+1). Thus, the cells whose charge level is only slightly greater than that of the least charged cell, will continue their normal charging.

The discrimination between the cells subjected to temporary limitation of the charge and those which are not (during a fractional time of the total charging time), can for example derive from the situation (in terms of values) of the levels of charge of these cells relative to a given threshold value by [value of the least charged cell+delta (Δ)].

Moreover, by adopting the strategy of limiting the charge current of the most charged cells all during the charging of the battery from instant $t_1$, instead of waiting to the end of said charge, the invention permits avoiding any risk of overheating of the battery 2 because of late balancing and guarantees balanced voltages in the cells 1 at the end of charging.

Moreover, by beginning balancing at the instant $t_1$ and by continuing its action all along the following phase of the charging operation, it is possible to guarantee that the battery will be substantially balanced soon after instant $t_1$ and all during the consecutive charging phase, which is to say even in the case of interruption of the charging before its normal conclusion.

Figure 2:
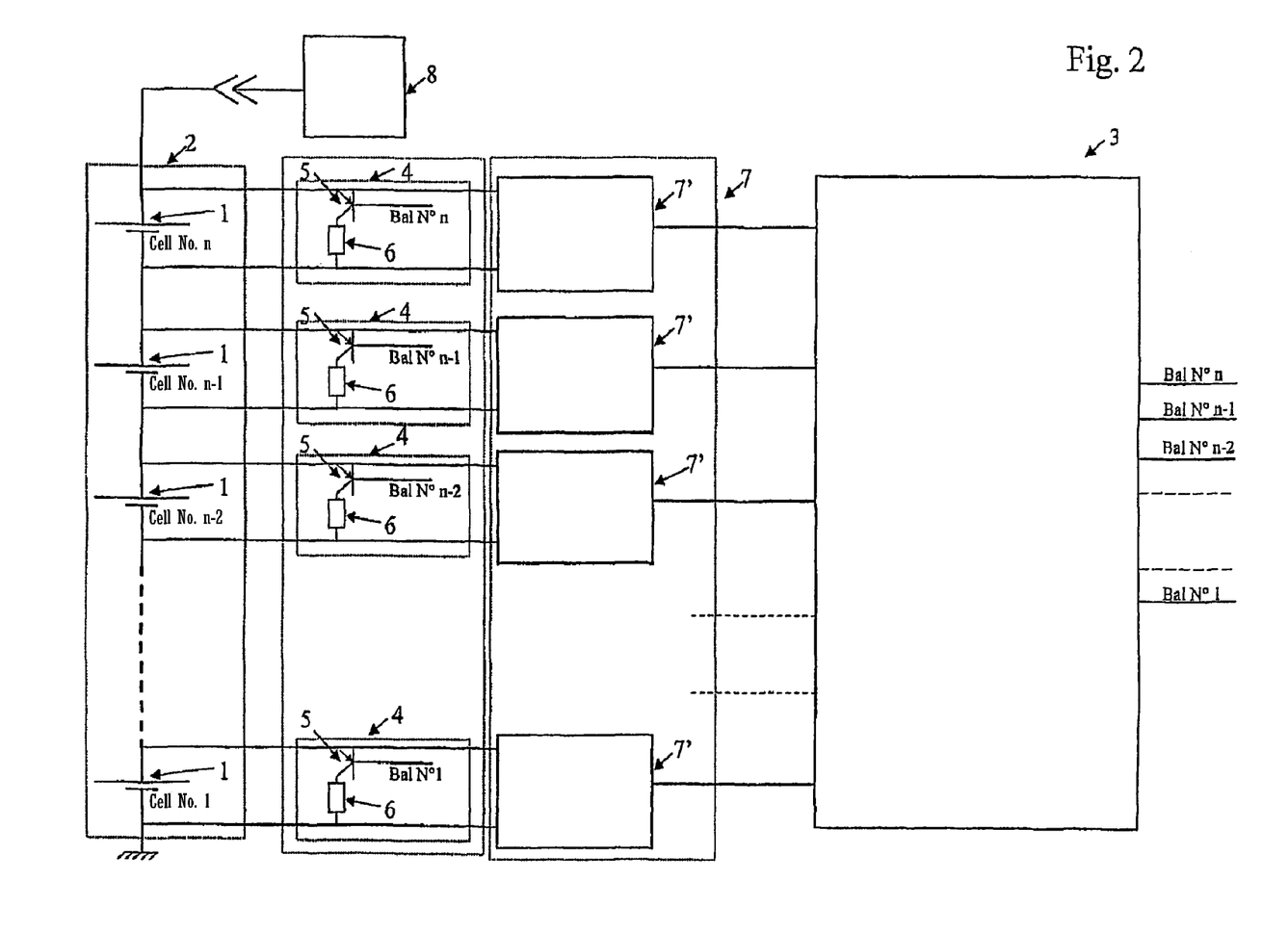
FIG. 2 of the accompanying drawings is a synoptic diagram of a device for practicing the process of the invention.
Figure 3:
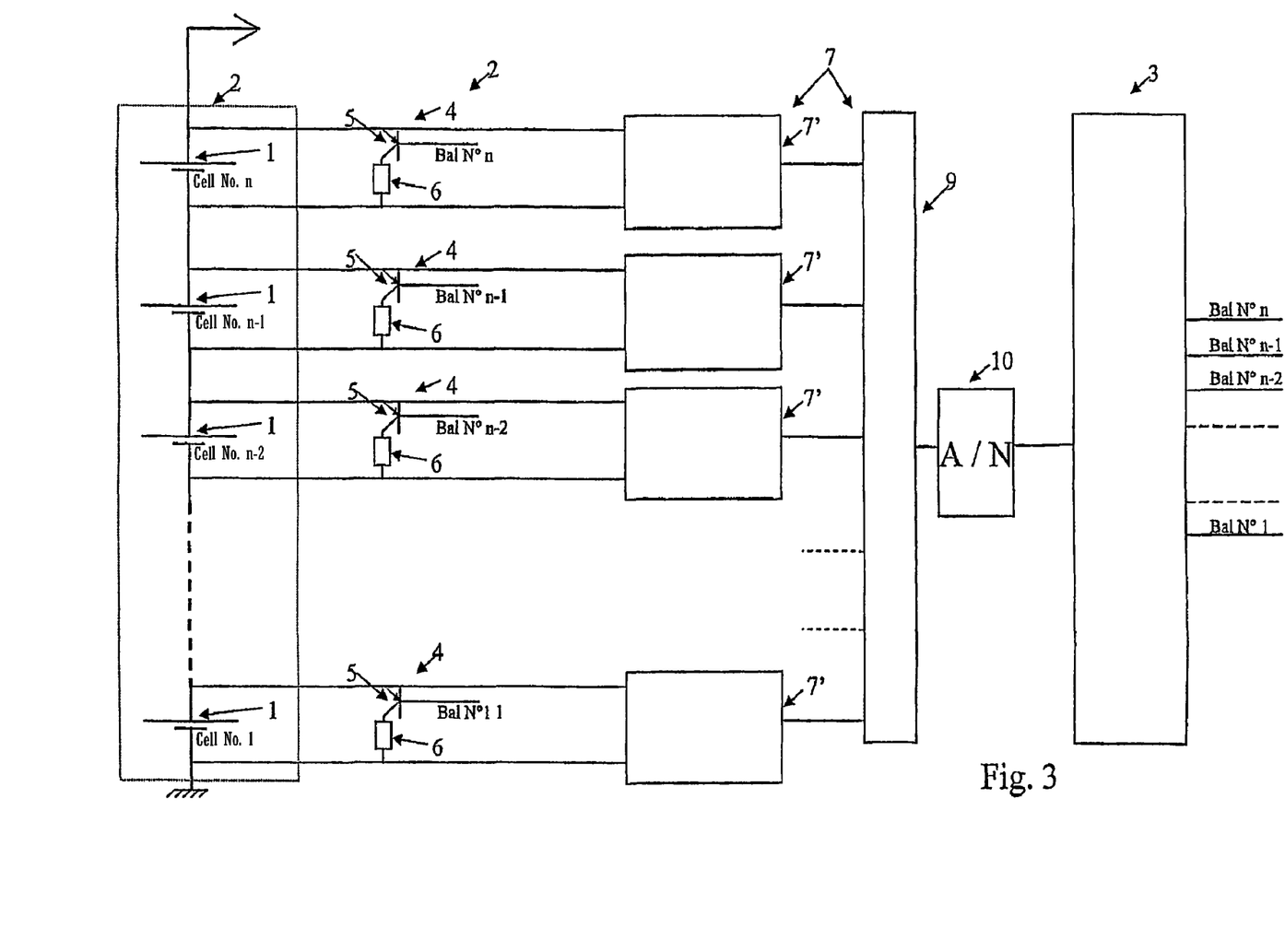
FIG. 3 is a more detailed diagram of the device shown in FIG. 2, according to a modified embodiment of the invention.

According to a preferred characteristic of the invention, the derivation of current in the most advanced cell in charging, is carried out by means of derivation circuits 4 each associated, by mounting in parallel, with one of said cells 1 (a circuit 4 for each cell 1), said circuits 4 each integrating a switching member 5 and, as the case may be, at least one component for dissipating electrical energy 6, if desired adjustable, such as for example an electrical resistance (FIGS. 2 and 3).

The switching member 5 could for example be selected from the group comprised by electromagnetic or electronic relays, bipolar transistors or with field effect or the like.

Moreover, the derivation of energy connected with balancing the charges of the different cells 1 being distributed over a large part, even as the case may be over almost all the duration of charging, the switching component 5, as well as the dissipation component 6 associated therewith, can be optimized.

According to a preferred embodiment of the invention, the charging with sequential balancing consists more precisely in carrying out, from the instant $t_1$ and by repeating over all the charging of the battery 2, the following operations:

a) scrutinizing one by one all the cells 1 of the battery 2 by measuring the voltages at their terminals, this without the resistances 6 of derivation or balancing being connected;

b) detecting the cell 1 which is tardiest to charge;

c) detecting the cells 1 which, relative to the cell 1 the tardiest to charge or the least charged, have an overcharge greater than a predetermined threshold value of spacing of capacitance, for example corresponding to a difference of voltage (dVs) of 10 mV;

d) individually connecting each cell 1 detected to have an overcharge greater than the threshold value, to a corresponding balancing resistance 6, so as to lead to decrease of the charging current for each of the cells 1 in question, for example by about 10%, during a predetermined sequential time, for example two seconds;

e) disconnecting the balancing resistances 6 of all the cells 1 after lapse of the predetermined sequential duration;

f) repeating the steps a) to e) after elapse of a stabilization delay of the voltages of the cells 1.

The charging of the battery is stopped normally when the intensity of the overall charging current of the assembly of cells of this latter falls below a predetermined threshold value, for example 50 mA.

By way of example of a way to practice the invention, the powers of the different derivation circuits 4 are selected to be near the values provided by the following formula:

$$Psd\max = \frac{V\max cell * \% * AH}{Tc}$$

in which:

Psd max=maximum power optimized to dissipate, expressed in watts;

Vmax cell=maximum voltage measured during charging at the terminals of a cell, expressed in volts;

%=ratio expressed in percentage, corresponding to the maximum spacing between two cells that it is desired to make up for during charging;

AH=nominal battery capacitance expressed in Ah (Ampere-hour);

Tc=time of battery charge expressed in hours.

Moreover, to provide precise and progressive regulation of the charging of each cell 1, the voltage at the terminals of each cell 1 is measured precisely by an assembly 7 of corresponding measuring modules 7', whose output signals are transmitted, preferably after digitization, to the digital processing unit 3, this latter controlling, in the following cycle, the switching members 5 of the different derivation circuits 4 as a function of the comparative development of said output signals provided by the modules 7'.

Figure 4:
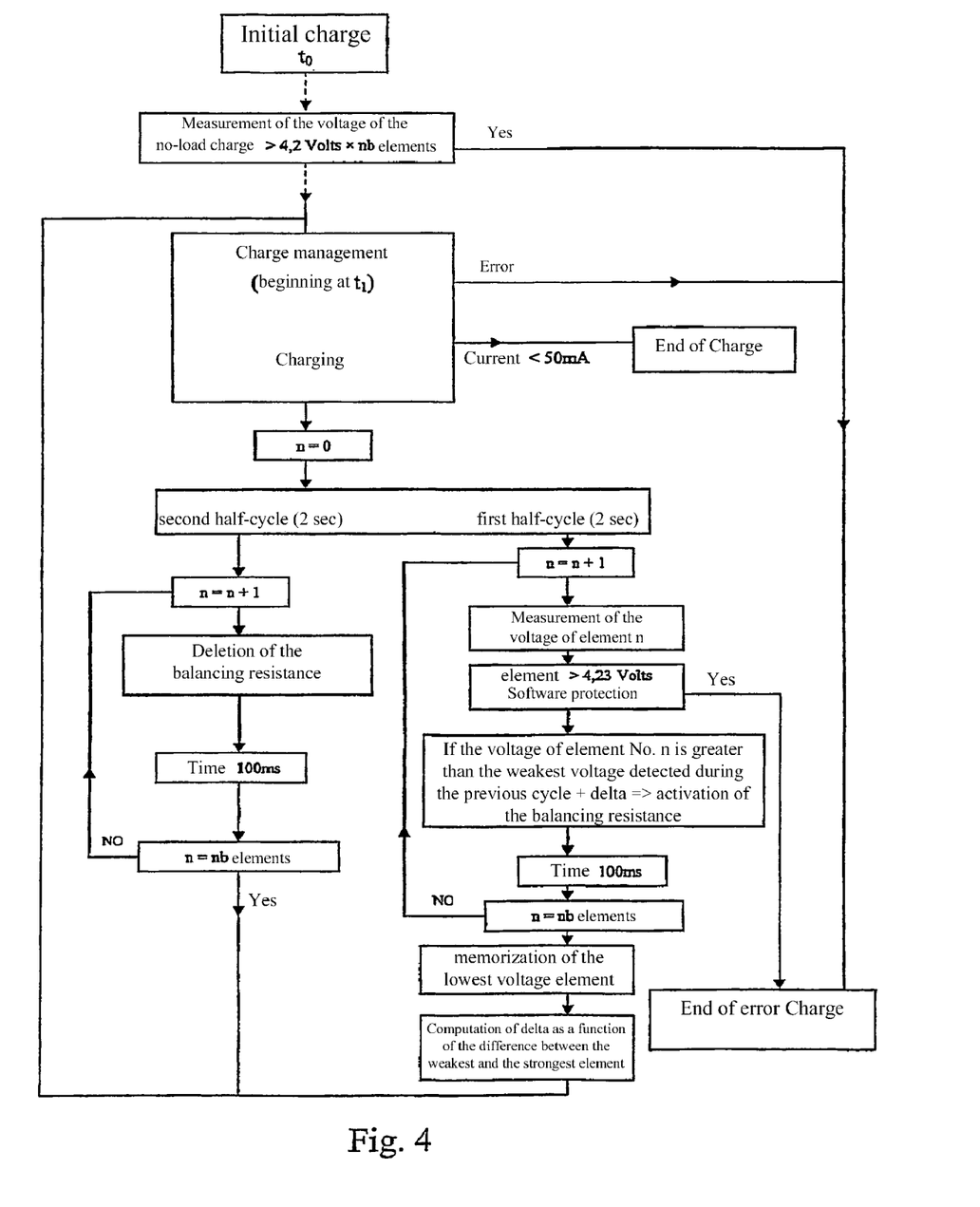
FIG. 4 is an ordinogram showing schematically the different steps of the process according to one embodiment of the invention (in this ordinogram, it is necessary to understand by the term "element", an element or a cell with several elements in parallel) and, FIG. 5 shows chronograms illustrating by way of non-limiting example, for a battery of twelve cells, the operations carried out during a charging cycle with balancing according to the process of the invention.
Figure 5:
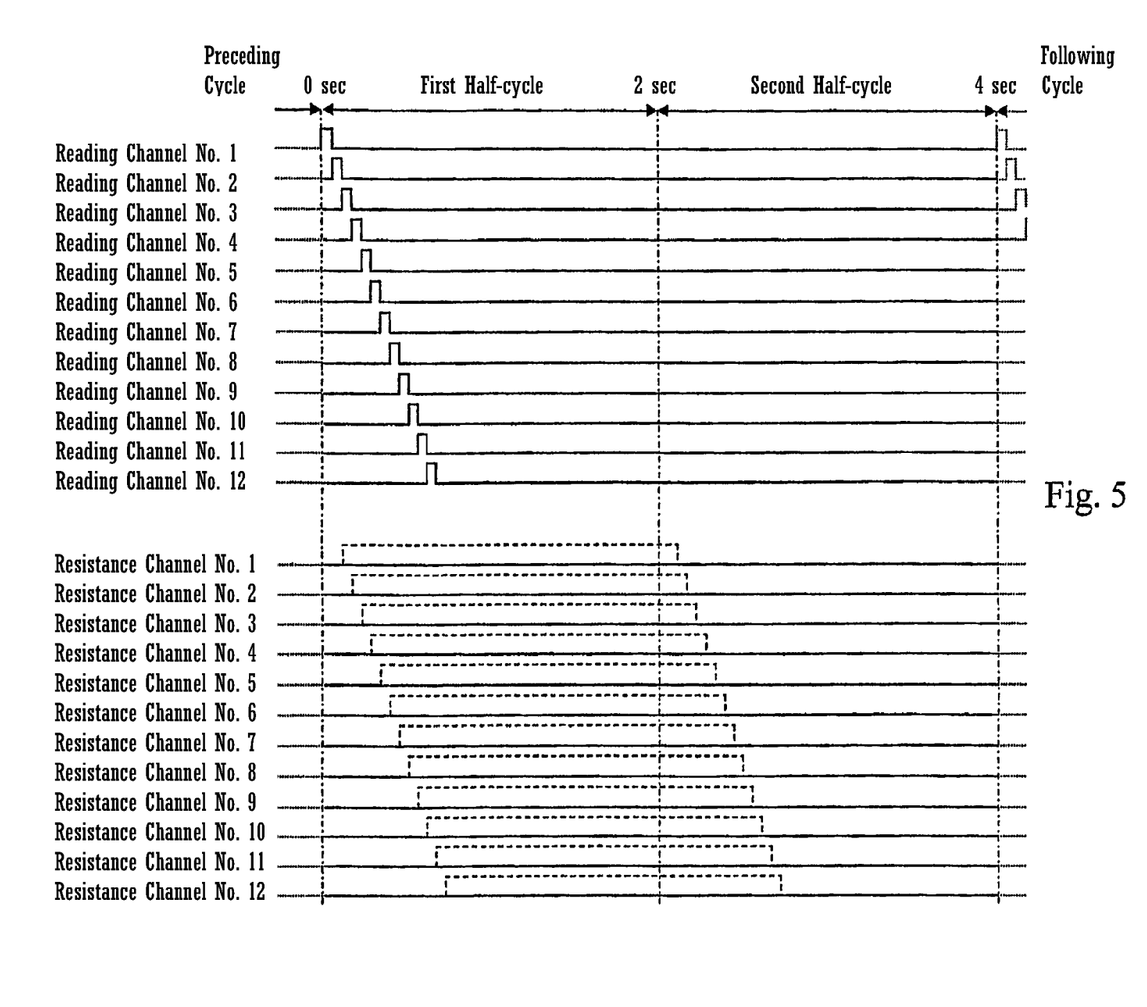

According to a very advantageous embodiment of the invention, referring by way of example to FIGS. 4 and 5, the operations are repeated, from the instant $t_1$ and during all the charging operation following this instant, in a cyclic loop formed by two operational half cycles, executed successively in each cycle loop, a first half cycle comprising the consecutive execution of the following operations: successive reading of the voltages of the different cells 1 and triggering, offset in time, the balancing resistance 6 for each cell 1 whose difference of voltage (dV) with the cell 1 that is tardiest to charge of the preceding cycle, is greater than a threshold value (dVs), and the second half cycle comprising the following operations: successive disconnection of the balancing resistances 6 of the different cells 1 and awaiting the stabilization of the voltages of different cells 1 before their reading during a first half cycle of the following cycle, the two half cycles having preferably durations substantially similar, for example about 2 seconds.

Thanks to the cyclic repetitions of the operations of the two half cycles (with a cycle duration for example of 4 seconds), during all the procedure of charging the battery 2 from the instant $t_1$, that is until the occurrence of an end of charging event or of safety information, all the cells 1 (and the element or elements comprising each of these latter) have at any time a low dispersion of capacitance (because of the connections of constant charge between the cells) and recovering in optimum manner their maximum performances.

Moreover, the process according to the invention permits accepting at the beginning of charging the great charge differences between cells 1, and the "adjustment" or balancing being distributed over the duration between instant $t_1$ and the end of the charging procedure of the battery 2.

According to a first modification, it can be provided that the threshold value of difference of voltage dVs consists in a first predetermined fixed value V1, for example 10 mV, if the voltage difference dV between the voltage of the cell 1 having the highest voltage and the voltage of the cell 1 having the least voltage, is less than a second predetermined fixed value V2, greater than the first predetermined threshold value V1, for example 100 mV.

Moreover, it can thus also be provided that, if the voltage difference dV between the voltage of the cell 1 having the highest voltage and the voltage of the cell 1 having the lowest voltage is greater than a second predetermined fixed value V2, for example 100 mV, the threshold value of voltage difference dVs consists in a third predetermined fixed value V3 less than said second value V2, for example 30 mV.

Preferably, the third predetermined fixed value V3 is greater than said predetermined fixed first value V1.

According to a second modification, it can, in an alternative manner, be provided that the threshold value of the difference of voltage dVs corresponds to a given fraction of the difference of voltage dV, measured during the preceding cycle, between the voltage of the cell 1 having the highest voltage and the voltage of the cell 1 having the lowest voltage, if during the cycle in question, said difference of voltage dV is again greater than a fourth fixed predetermined value V4, for example 10 mV.

Advantageously in each of the two mentioned variations, and as already mentioned above, the measurements of the voltages of the different cells 1 are taken, each time, only after the elapse of a given delay, for example 2 seconds, following the suppression of the current derivatives, so as to permit a stabilization of the voltages at the terminals of said cells 1.

So as to preserve the cells 1 of the battery 2 from possible exposure to over-voltage, the management program of charging, whose ordinogram can for example correspond to that shown in FIG. 4, can comprise the execution of a certain number of tests before the beginning of the charge and in the course of and at the end of charging.

Thus, the charging process can consist, at the outset, before starting execution of the charging operations, in measuring the no load voltage Vo of the charger 8 connected to the battery 2 as to its charge, and in stopping said charging process, with possible triggering of a corresponding alarm and/or display of a message, if said no load voltage Vo is greater than [n×maximum permissible voltage Vmax for each cell 1].

Similarly, said process can also consist, before execution of a loop or a following cycle, in verifying whether at least one of the cells 1 of the battery 2 has at its terminal a voltage greater than the maximum permissible voltage Vmax (for example and not in a limiting sense 4.23 V) and, in the affirmative, interrupting the charging process, if desired with triggering of a corresponding alarm and/or display of a message.

The present invention also has for its object a device for practicing the process described above, of which the principal constituent elements are shown schematically in FIGS. 2 and 3.

This device is essentially constituted, on the one hand, by an assembly 7 of modules 7' for measuring the associated voltage at one of the cells 1 in series forming the battery 2 and measuring the voltages at the terminals of these latter, on the other hand, by a plurality of derivation circuits 4 each mounted in parallel with the terminals of a corresponding cell 1 and being adapted to be opened and closed selectively, and, finally, by a unit 3 for digital processing and management of the process, said unit 3 receiving the measurement signals from said assembly 7 of modules for measuring the voltage 7' and controlling the condition [closed/opened] of each derivation circuit 4.

The module 7' will consist for example in circuits for differential measurement of voltage with an operational amplifier, with a precision of measurement of at least 50 mV.

Preferably, each derivation circuit 4 comprises a switching member 5, forming a switch and whose condition is controlled by the digital processing unit 3 and, as the case may be, at least one component 6 for dissipation of electrical energy, such as for example one or more resistances.

As shown in FIG. 3 of the accompanying drawings, and according to a preferred embodiment of the invention, the assembly 7 of modules 7' for measuring the voltage comprises, on the one hand, n analog modules 7' for measuring voltage, each associated directly with a cell 1 of the battery 2, and on the other hand, in a multiplexer circuit 9 whose inputs are connected to the outputs of said module 7', and, finally, an analog/digital converter circuit 10 connected at its input to the output of the multiplexer circuit 9 and at its outlet to the digital processing and management unit 3.

As to a preferred application, and without limitation of the invention, the device shown in FIGS. 2 and 3 could desirably be integrated into a self-contained electric power tool assembly.

In this connection, it should be noted that the derivation circuits 4 associated individually with the cells 1 of the battery 2, could also be used if desired to adjust the charges of said cells 1 to a level compatible with long time storage, without use, of said battery 2.

Of course, the invention is not limited to the embodiments described and shown in the accompanying drawings. Modifications remain possible, particularly as to the construction of the various elements or by substitution of technical equivalents, without thereby departing from the scope of protection of the invention.

The invention claimed is:

1. Process for the balanced charging of n cells, with n≧2, constituting a lithium ion or lithium polymer battery and associated in series, each of the cells being comprised by one or several elements mounted in parallel in the battery, the process comprising, for each charging operation, providing continuously or cyclically, from an instant ($t_1$) subsequent to the onset of the charging operation to the end or anticipated interruption of this operation, a surveillance of the levels of charge of the different cells, and carrying out, as a function of the mentioned evaluation of said charge levels, either a uniform supply of all the cells, or a balancing of said charge levels of said cells by supplying these latter in a differentiated manner as a function of their current levels of charge;

triggering for each cell of the battery, one after the other, in a sequential manner, for a fractional portion of the total charge time of the battery, sequences comprising a refreshed evaluation of the level of the charge of the cell in question, followed, as a function of its level of charge and with respect to all the levels of charge of the other cells of the battery, a uniform or differentiated supply, this according to a repeating cycle from the instant ($t_1$) and throughout the following course of the operation of charging;

wherein execution of the following operations is under the management of a digital processing unit from the instant $t_1$:

evaluation of the quantity of energy stored in each cell by measuring a parameter indicative of said quantity;

comparative analysis of the different evaluated quantities of energy or of the different values of the measured parameter for each cell;

determination of the cell tardiest to charge and of the cell or cells the most advanced in charging;

supplying the different cells mounted in series in a uniform manner or with the limitation of charging current for the cells other than the tardiest or for the cell or cells most advanced in charging, by derivation of all or a portion of said current at the level of this or these latter; and sequential repetition of the different mentioned operations obtaining an end condition of charge of the battery or the detection of a fault, of a dysfunction or an exceeding of an admissible threshold value.

2. Process according to claim 1, wherein the measured parameter in each cell and utilized for evaluation of the quantity of energy stored in this latter, is the voltage at the terminals of the cell in question.

3. Process according to claim 1, wherein the derivation of current in the cell or cells that are most advanced in charging, is carried out by a means of derivation circuits each associated by mounting in parallel with one of said cells, said circuits each integrating a switching member and at least one component for dissipation of energy.

4. Process according to claim 2, wherein charging with sequential balancing consists in carrying out from the instant $t_1$ and, while repeating them during the course of charging the battery, the following operations:

a) scrutinizing one by one all the cells of the battery by measuring the voltages at their terminals, this without the resistances of derivation or balancing being connected;

b) detecting the cell tardiest to charge;

c) detecting the cells which, relative to the least charged or tardiest cell, have an overcharge greater than a predetermined threshold value of difference of capacity;

d) individually connecting each cell detected to have a surcharge greater than a threshold value, to a corresponding balancing resistance so as to produce a decrease of the charging current for each of the cells in question during a predetermined sequential duration;

e) disconnecting the balancing resistances of all the cells after lapse of the predetermined sequential duration;

f) carrying out again steps a) to e) after the lapse of a stabilization delay of the voltages of the cells.

5. Process according to claim 1, wherein the charging of the battery is stopped when the current intensity of the overall charge of the assembly of cells of this latter descends below a predetermined threshold value.

6. Process according to claim 3, wherein the voltage at the terminals of each cell is measured by an assembly of corresponding measurement modules, whose output signals are transmitted to the digital processing unit, this latter controlling, in the following cycle, the switching members of the different derivation circuits as a function of the comparative development of said output signals provided by the corresponding measurement modules.

7. Process according to claim 1, wherein the operations are repeated, from the instant ($t_1$) and during all the charging operation, as a cyclic loop formed by two operational half cycles, carried out successively at each cycle loop, a first half cycle comprising the consecutive execution of the following operations:

successive reading of the voltages of the different cells and triggering, offset in time, the balancing resistance for each cell whose voltage difference (dV) with the tardiest cell of the preceding cycle is greater than a threshold value (dVs), and the second half cycle comprising the following operations:

successive disconnection of the balancing resistances of the different cells and waiting for the stabilization of the voltages of the different cells before their reading during the first half cycle of the following cycle, the two half cycles having substantially similar durations.

8. Process according to claim 7, wherein the threshold value of the difference of voltage (dVs) corresponds to a given fraction of the voltage difference (dV), measured during the preceding cycle between the voltage of the cell having the highest voltage and the voltage of the cell having the lowest voltage, if during the cycle taking place, said voltage difference (dV) is still higher than a fourth predetermined fixed value (V4).

9. Process according to claim 7, wherein the measurements of the voltages of the different cells are carried out only after the lapse of a give delay following the suppression of the current derivations, so as to permit stabilization of the voltages at the terminals of said cells.

10. Process according to claim 3, wherein powers of the different derivation circuits are selected to be near the values provided by the formula:

$$Psd\ max = \frac{V\max cell * \% * AH}{Tc}$$

in which:

Psd max=maximum power optimized to dissipate, expressed in watts;

Vmax cell=maximum voltage measured during charging at the terminals of a cell, expressed in volts;

%=ratio expressed in percentage, corresponding to the maximum difference between two cells to compensate during charging;

AH=nominal capacitance of the battery expressed in Ah (Ampere-hours); and

Tc=battery charge time expressed in hours.

11. Process according to claim 1, further comprising, before triggering the execution of the charging operations, measuring the standby voltage (Vo) of a charger connected to the battery as to its charge, and stopping said charging process with the triggering of a corresponding alarm and/or display of a message, if said standby voltage (Vo) is greater than nxmaximum admissible voltage (Vmax) for each cell.

12. Process according to claim 7, further comprising, before the execution of a following loop, verifying whether at least one of the cells of the battery has at its terminals a voltage higher than the maximum admissible voltage (Vmax) and, in the affirmative, in interrupting the process of charging with the triggering of a corresponding alarm and/or display of a message.

13. Device for the practice of a process according to claim 1, comprising:

an assembly of modules for measuring the voltage associated each with one of the cells in series forming the battery and measuring the voltages at the terminals of these latter;

a plurality of derivation circuits each mounted in parallel with the terminals of a corresponding cell and each being adapted to be opened and closed selectively; and a digital processing unit for managing the process, said unit receiving measurement signals from said assembly of measuring modules of the voltage and controlling the open/closed condition of each derivation circuit.

14. Device according to claim 13, wherein each derivation circuit comprises a switching member, forming a switch whose condition is controlled by the digital processing unit, and at least one component for dissipation of electrical energy.

15. Device according to claim 13, wherein the assembly of modules for measurement of the voltage comprises n analog modules for measuring the voltage, each associated directly with a cell of the battery, a multiplexing circuit whose inputs are connected to the outputs of said modules, and an analog/digital converter circuit connected at its input to the output of the multiplexer circuit and at its output to the digital processing and management unit.

16. Device according to claim 13 integrated into an assembly of a self-contained electric power tool.

17. A process for balanced charging of n cells, with n≧2, constituting a lithium ion or lithium polymer battery and associated in series, each cell being comprised by one or several elements mounted in parallel, the process comprising, for each charging operation, providing continuously or cyclically, from an instant ($t_1$) subsequent to the onset of the charging operation to the end or anticipated interruption of this operation, a surveillance of the levels of charge of the different cells, and carrying out, as a function of the mentioned evaluation of said charge levels, either a uniform supply of all the cells, or a balancing of said charge levels of said cells by supplying these latter in a differentiated manner as a function of their current levels of charge, wherein execution of the following operations is under the management of a digital processing unit from the instant $t_1$:

evaluation of the quantity of energy stored in each cell by measuring a parameter indicative of said quantity;

comparative analysis of the different evaluated quantities of energy or of the different values of the measured parameter for each cell;

determination of the cell tardiest to charge and of the cell or cells the most advanced in charging;

supplying the different cells mounted in series in a uniform manner or with the limitation of charging current for the cells other than the tardiest or for the cell or cells most advanced in charging, by derivation of all or a portion of said current at the level of this or these latter; and sequential repetition of the different mentioned operations obtaining an end condition of charge of the battery or the detection of a fault, of a dysfunction or an exceeding of an admissible threshold value, wherein the operations are repeated, from the instant ($t_1$) and during all the charging operation, as a cyclic loop formed by two operational half cycles, carried out successively at each cycle loop, a first half cycle comprising the consecutive execution of the following operations:

successive reading of the voltages of the different cells and triggering, offset in time, the balancing resistance for each cell whose voltage difference (dV) with the tardiest cell of the preceding cycle is greater than a threshold value (dVs), and the second half cycle comprising the following operations:

successive disconnection of the balancing resistances of the different cells and waiting for the stabilization of the voltages of the different cells before their reading during the first half cycle of the following cycle, the two half cycles having substantially similar durations, and wherein the threshold value of voltage difference (dVs) consists in a first predetermined fixed value (V1), if the voltage difference (dV) between the voltage of the cell having the highest voltage and the voltage of the cell having the least voltage is less than a second predetermined fixed value (V2), greater than the first predetermined threshold value (V1).

18. Process according to claim 17, wherein, if the voltage difference (dV) between the voltage of the cell having the highest voltage and the voltage of the cell having the lowest voltage is greater than a second predetermined fixed value (V2), the threshold value of voltage difference (dvs) consists of a third predetermined fixed value (V3) less than said second value (V2).

19. Process according to claim 17, wherein the third predetermined fixed value (V3) is greater than said first predetermined fixed value (V1).

* * * * *